United States Patent [19]
White

[11] 3,753,536
[45] Aug. 21, 1973

[54] SPACE VEHICLE COUPLING MECHANISMS
[75] Inventor: Neville White, Portishead, England
[73] Assignee: British Aircraft Corporation Limited, London, England
[22] Filed: Sept. 29, 1971
[21] Appl. No.: 184,817

[30] Foreign Application Priority Data
Oct. 2, 1970  Great Britain.................. 46,917/70

[52] U.S. Cl................ 244/1 SD, 244/2, 244/135 A
[51] Int. Cl............................................... B64g 9/00
[58] Field of Search.............. 244/1 SS, 1 SD, 1 TD, 244/135 A, 2; 213/75 R

[56] References Cited
UNITED STATES PATENTS
| | | | |
|---|---|---|---|
| 3,049,319 | 8/1962 | Elder et al. | 244/2 |
| 3,091,419 | 5/1963 | Mosher | 244/135 A |
| 3,201,065 | 8/1965 | Dunn | 244/1 SD |
| 3,391,881 | 7/1968 | Maltby | 244/1 SD |
| 3,508,723 | 4/1970 | Warren et al. | 244/1 SD |

Primary Examiner—Milton Buchler
Assistant Examiner—Barry L. Kelmachter
Attorney—Cushman, Darby & Cushman

[57] ABSTRACT

A mechanism for the coupling of one space vehicle to another includes a coupling means on each vehicle, each coupling means having a primary engagement device and a secondary engagement device so positioned and axially spaced prior to coupling of the vehicles that engagement and locking is achieved firstly only by the two primary engagement means and, subsequently, on altering the axial spacing between the primary and secondary engagement means on one vehicle, by the two secondary engagement means.

6 Claims, 8 Drawing Figures

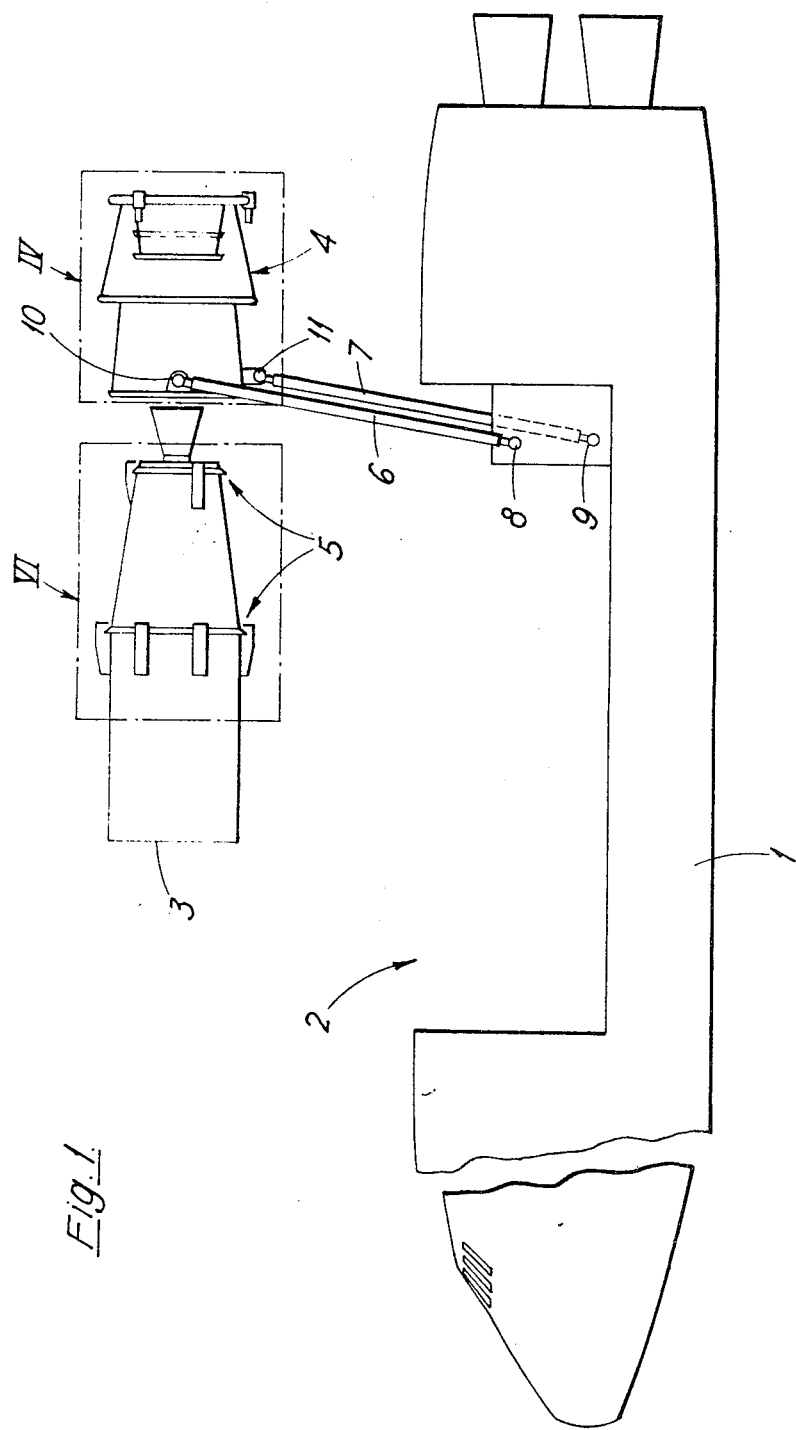

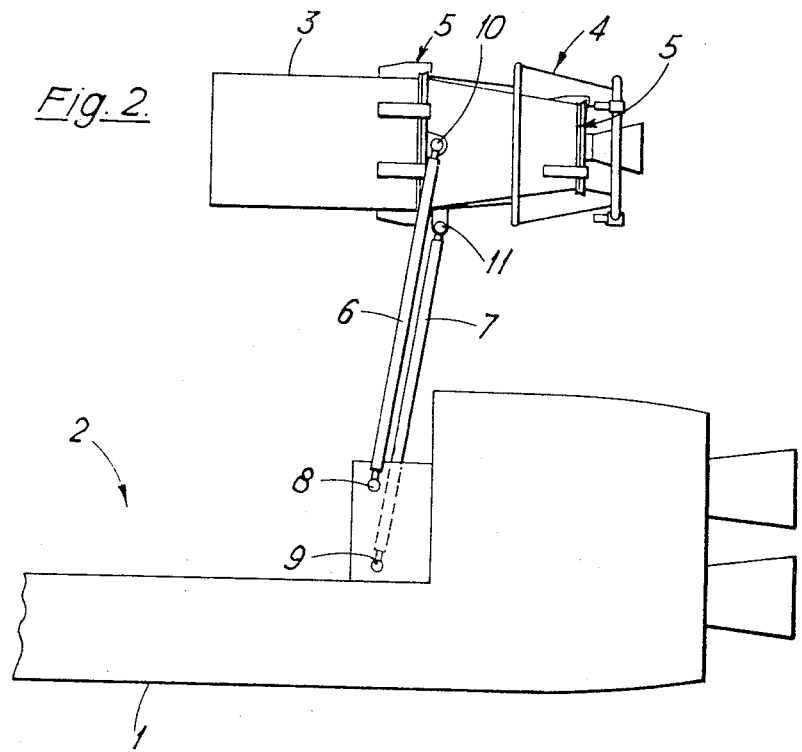
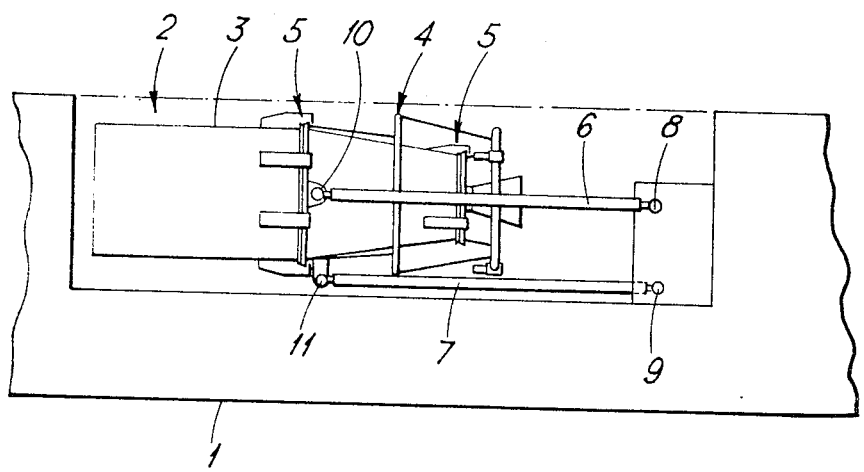

SPACE VEHICLE COUPLING MECHANISMS

This invention relates to mechanisms for the coupling of one space vehicle to another during flight.

In such a mechanism two primary considerations must be taken into account namely, the transfer of kinetic energy due to initial contact between the vehicles must be at least partially absorbed, and, subsequently, the vehicles must be rigidly coupled together to form a stable composite structure.

According to the present invention, a mechanism for the coupling of one space vehicle to another includes a coupling means on each vehicle, each coupling means having a primary engagement device and a secondary engagement device in axially spaced relationship with one another, there being provided latching means for locking the two primary engagement devices together and further latching means for locking the two secondary engagement devices together, and shock absorbing devices on one vehicle operatively inter-connecting the primary engagement device with the secondary engagement device on that vehicle, actuation means being provided to axially move the primary engagement device and the secondary engagement device on one vehicle from a first position wherein only the primary engagement devices engage and lock together, to a second position wherein the secondary engagement devices engage and lock together.

By this arrangement any shock of initial engagement between the two vehicles, that is to say, between the two primary engagement devices, is at least partially absorbed by the shock absorbing devices instead of being transmitted wholly from one vehicle to the other. By this arrangement also any relative movement between the two coupled vehicles due to the presence of the shock absorbing devices, which by their very nature allow some movement, is minimized by the subsequent engagement of the secondary engagement devices and accordingly a stable composite vehicle is achieved.

Preferably at least the secondary engagement device on one vehicle is of annular form and the primary engagement device on the other vehicle is so dimensioned to pass through it and engage the primary engagement device on said one vehicle. In this case, in effect, one vehicle includes a male coupling means and the other includes a female coupling means.

All four engagement devices may be of annular form in which case the two primary and the secondary engagement devices respectively have mating frustroconical surfaces which tend to urge the vehicles into alignment on engagement.

The shock absorbing devices and the actuation means are preferably incorporated in the coupling means on one vehicle, there being an intermediate tubular-shaped structure between the first and the secondary engagement devices to which the shock absorbing devices and the actuation means are attached.

A preferred embodiment of the present invention is now described with reference to the accompanying drawings. In these drawings:

FIG. 1 is a diagrammatic side elevation of a carrier space vehicle with a smaller vehicle which is normally carried within it about to be engaged.

FIG. 2 is a similar view of part of FIG. 1 with the smaller vehicle engaged,

Figure 4:
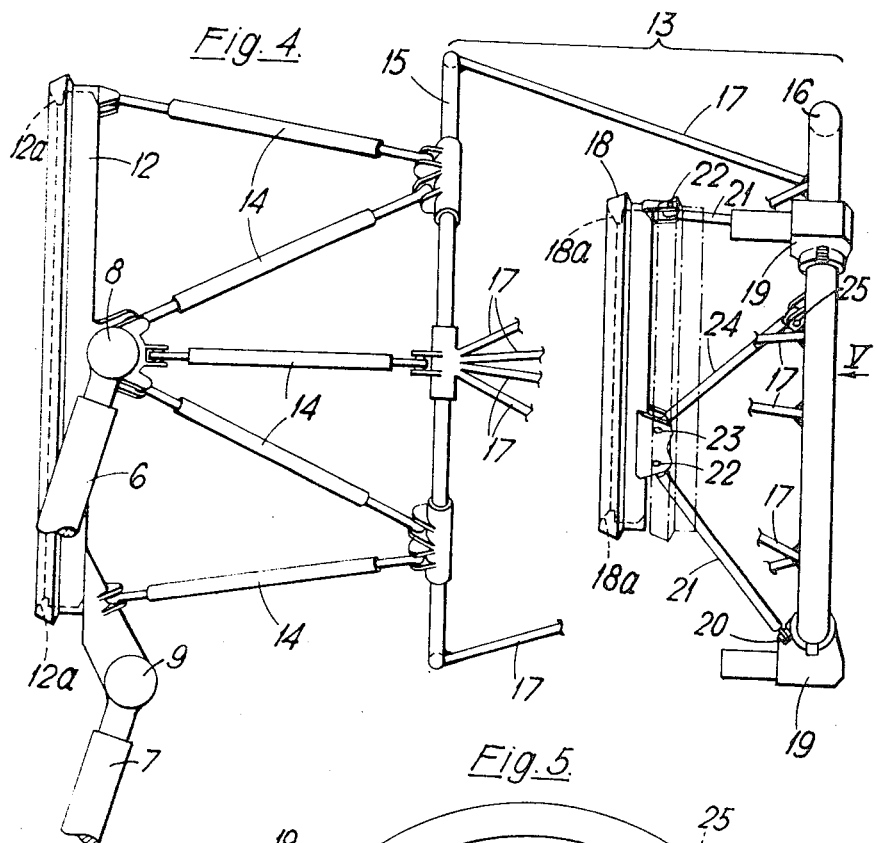
Figure 5:
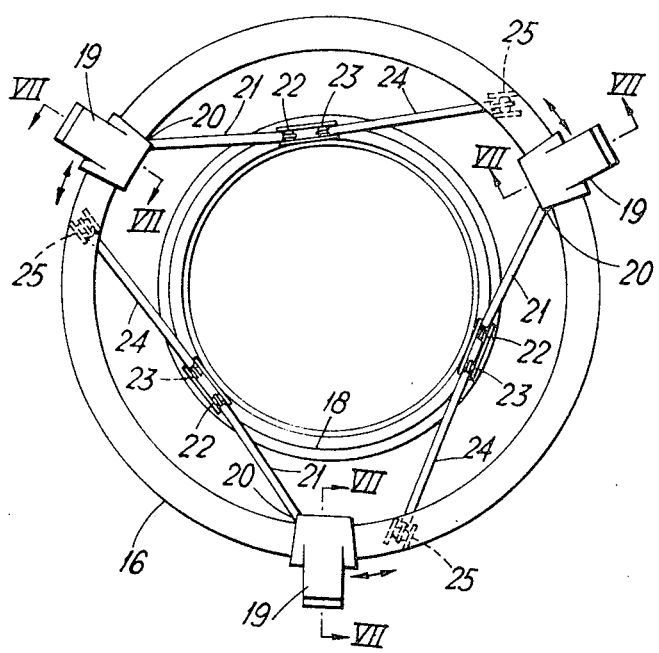
Figure 6:
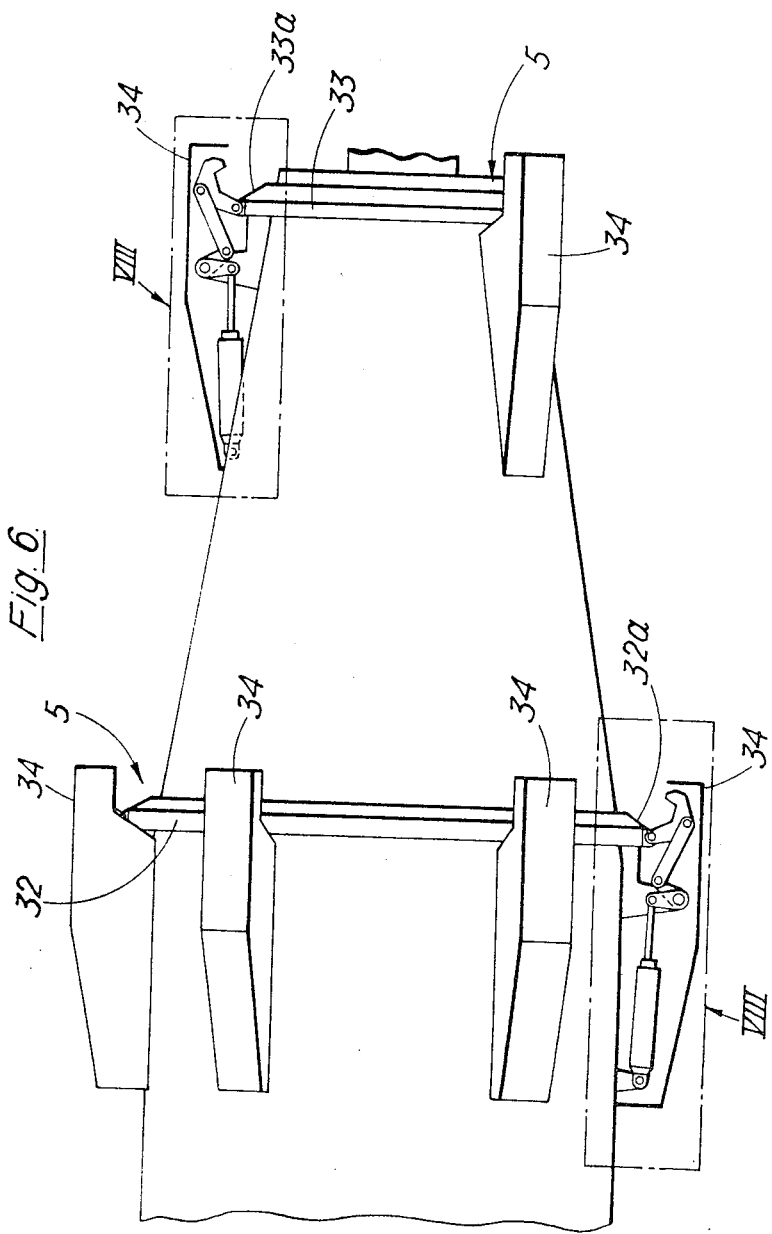
Figure 7:
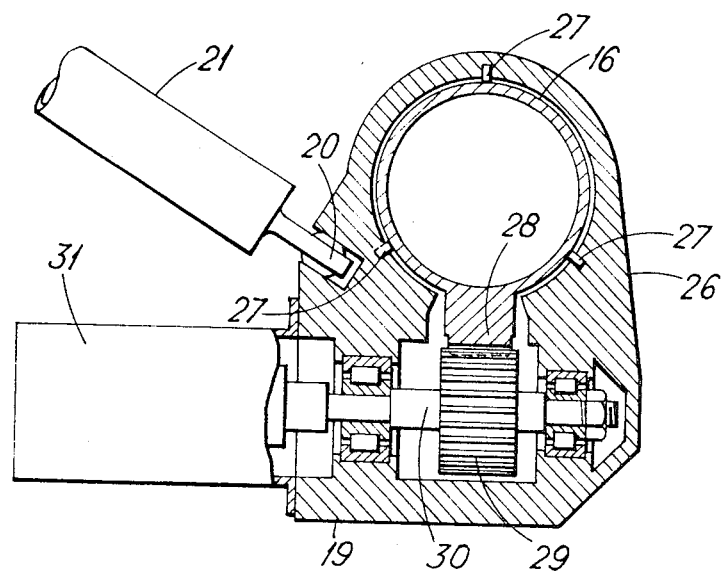
Figure 8:
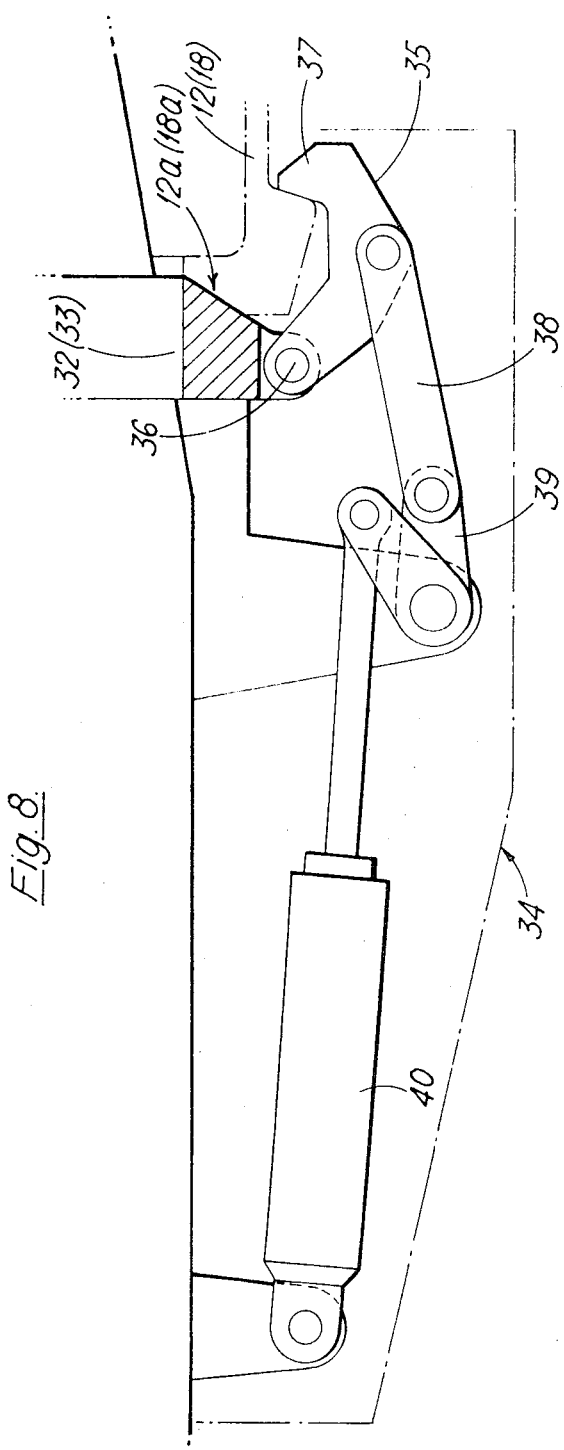

FIG. 3 is a similar view of part of FIG. 1 with the smaller vehicle carried within the carrier vehicle, FIG. 4 is an enlarged view of that part of FIG. 1 enclosed in block IV, FIG. 5 is an end view on Arrow V of FIG. 4, FIG. 6 is an enlarged view of that part of FIG. 1 enclosed in block VI, FIG. 7 is an enlarged part-sectional view taken on lines VII—VII of FIG. 5, and FIG. 8 is an enlarged part-sectional view of those parts of FIG. 6 enclosed in boxes VIII.

In FIGS. 1, 2 and 3, a carrier space vehicle 1 has a hold 2 in which a carried space vehicle 3 can be temporarily stowed.

Prior to and during stowage the carried vehicle 3 is attached to the carrier vehicle 1 by coupling means 4 mounted on the carrier vehicle 1 and coupling means 5 mounted on the carried vehicle 3. That mounted on the carrier vehicle 1 is capable of being extended from and retracted into that vehicle by means of arms 6 and 7 which are pivoted both on the carrier vehicle 1 at 8 and 9 respectively, and on the coupling means 4 at 10 and 11 respectively.

The arms 6 and 7 are arranged to maintain the axis of the coupling means 4 parallel to that of the carrier vehicle 1 at all times.

FIGS. 4, 5 and 6 show, in somewhat enlarged form, more details of the coupling means 4 and the coupling means 5, respectively.

In FIGS. 4 and 5 the pivots 8 and 9 and hence the arms 6 and 7, are connected to an annulus 12 which forms one secondary engagement device. This annulus 12 is itself connected to an intermediate tubular-shaped structure 13 by means of a series of pivotally mounted shock-absorbing devices 14 of the type capable of a small amount of telescopic movement.

The tubular-shaped structure 13 comprises an annulus 15, to which the shock-absorbers 14 are pivoted, and a further annulus 16 rigidly connected to the annulus 15 by a series of rods 17. Some of the latter are shown in a discontinuous manner to avoid obscuring details of a further structure radially inwards thereof and which is now described.

Mounted in the interior of the structure 13 is yet a further annulus 18 which forms one primary engagement device.

The annuli 12, 15, 16 and 18 are all co-axially arranged one with another and remain so during all coupling motions of the mechanism.

The annulus 18 is attached to the annulus 16 with a capability of bodily axial movement with respect to it. This is achieved by three equally angularly spaced motor units 19 mounted for uniform limited movement in a peripheral sense around the annulus 16 which in effect forms a track. The motor units 19 are described in detail with reference to FIG. 7.

On each motor unit 19 is pivotally mounted at 20 a tie rod 21 which extends diagonally towards the annulus 18 and is pivotally connected to it at 22. Both pivotally mounted ends of the rod 21 are located in part-spherical bearings. Adjacent each pivotal connection 22 on the annulus 18 is a further pivotal connection 23 from which a further tie rod 24 extends diagonally to the annulus 16 where it is pivotally anchored at 25. Again the pivotal connections 23 and 25 are provided with part-spherical bearings.

Simultaneous movement of the motor units 19 around the annulus 16 in the anticlockwise sense, as shown in FIG. 5 causes the distance between the pivotal connections 20 and the pivotal anchorages 25 to increase and thereby, due to the diagonal disposition of the tie rods 21 and 24, to draw the annulus 18 from the position shown in hard outline in FIG. 4 to the position shown in broken outline in that same Figure i.e. the movement is toward the annulus 16 and away from that referenced 12. Movement of the motor units 19 in the opposite sense has the reverse effect.

The hard outline position of the annulus 18 in FIG. 4 corresponds to that of FIG. 1 whilst the broken outline corresponds to that of FIGS. 2 and 3.

The bodily axial movement of the annulus 18 effected by the motor units 19 is much greater than the axial movement accommodated by the shock-absorbers 14.

The annulus 12 has a forward facing concave frustro-conical surface 12a. The annulus 18 has a similar surface 18a. The function of these surfaces will be described later in the specification.

Referring now to FIG. 7, each motor unit 19 comprises a housing 26 which locally surrounds the annulus 16 and is guided to move thereon by rollers 27. The annulus 16 is formed with a short stretch of toothed rack 28 in the vicinity of each motor unit 19 which is engaged by a toothed gear wheel 29. The gear wheel 29 is itself mounted a shaft 30 mounted in bearings and driven by an electric or other motor 31. Operation of the motor 31 thus causes the motor unit to be propelled along the track 28 and hence moved relatively to the annulus 16.

The coupling means 5 on the carried vehicle 3 is shown in somewhat enlarged form in FIG. 6. It comprises an annulus 32 and an annulus 33, the annulus 32 having a rearward facing convex frustro-conical surface 32a and the annulus 33 having a similar surface 33a. The surface 32a is of such dimensions that it is a mating fit with the surface 12a on annulus 12 whilst that referenced 33a is of such dimensions to be a mating fit with the surface 18a on annulus 18.

The annulus 33 is also dimensioned to pass axially through the annuli 12 and 15 of the coupling means 4. Furthermore, the annuli 32 and 33 of the coupling means 5 are spaced apart by a distance such that on engagement of the annulus 18 by the annulus 33 when the annulus 18 is in the hard outline position of FIG. 4, the annuli 32 and 12 remain apart, but when the annulus 18 is in the broken outline position of FIG. 4, the annuli 32 and 12 become engaged. The distance between the two positions of the annulus 18 is sufficiently great so that any contraction of the shock absorbers 14 is insufficient to allow premature contact of the annuli 32, 12.

Engagement and locking of one annulus to another is achieved by latching mechanisms 34 which are mounted around the periphery of the annuli 32 and 33 of the coupling means 5. Three such mechanisms 34 are shown on the annulus 33 which forms part of the primary engagement device and six such mechanisms 34 are shown on the annulus 32 which forms part of the secondary engagement device. The numbers of these latching mechanisms are given and illustrated by way of example only; there may be more or less according to circumstances.

FIG. 8 illustrates a typical latching mechanism 34 in enlarged detail.

A latch 35 is pivoted to the annulus 32 (or 33) at 36 and has a radially inwardly projecting finger 37 which, when the annuli 32, 12 (or 33, 18) are in engagement can be moved to grip the annulus 12 (or 18) and to lock it in the engaged position. This position is shown in FIG. 8.

Movement of the latch 35 is by means of link 38, bellcrank 39 pivoted to the annulus 32 (or 33) and fluid jack 40. Extension of the jack moves the latch 35 to its locked position whilst contraction moves it to its open or unlocked position. The linkage 38, 39 forms an over-centre or geometric locking system so that the latch is held closed by the linkage rather than the jack 40.

In operation, assuming the carrier vehicle 1 to have its coupling means 4 extended and the carried vehicle 3 to be axially aligned with the coupling means 4, as illustrated in FIG. 1, the carrier vehicle 1 is edged forward so that the tail end of the carried vehicle 3 passes through the annuli 12 and 15 of the coupling means 4 so that the annulus 33 engages the annulus 18, that is to say the primary engagement devices engage. The annulus 18 is initially in its forward position shown in hard outline in the Figures. The surfaces 33a and 18a mate with one another, their conical shape ensuring that any minor misalignment between the coupling means 4 and 5 is taken up and the couplings are centralised. Any shock due to engagement of the primary engagement devices is at least partially absorbed by the shock absorbers 14. On engagement of the annuli 33 and 18, the latches 35 of the latching means 34 which were initially open, are closed by extending the jacks 40. The fingers 37 then lie behind the annulus 18 as shown in FIG. 8 and clamp the two annuli together.

FIGS. 2 and 4 illustrate the next stage of operation which comprises the drawing of the annulus 18 towards the annulus 16. The motor units 19 are simultaneously actuated to move anticlockwise (as shown in FIG. 5) around the annulus 16 thereby moving the annulus 18 from the position illustrated in hard outline to the position shown in broken outline. Naturally, the annulus 18 draws the annulus 33 along with it moving the coupling means 5 (and the carried vehicle 3) axially until the annulus 12 engages the annulus 32 (these being the secondary engagement devices) and are locked together by means of the latching devices 34. Again the surfaces 32a and 12a by virtue of their frustro-conical form ensure that the two coupling means 4 and 5 are fully aligned with one another.

The vehicles are rigidly coupled and locked together by both the primary and secondary engagement devices, as shown in FIG. 2 and the carried vehicle 3 can be swung into the hold 2 of the carrier vehicle 1. This is shown in FIG. 3.

Uncoupling of the carried vehicle 3 for flight by itself is effected in exactly the opposite sequence to that described.

I claim:

1. A mechanism for the coupling of one space vehicle to another including a coupling means on each vehicle, each coupling means having a primary engagement device and a secondary engagement device in axially spaced relationship with one another, the secondary engagement device on one vehicle being of annular form and the primary engagement device of the other vehicle being so dimensioned to pass therethrough to engage the primary engagement device of said one vehicle, there being provided latching means for locking the two primary engagement devices together, shock absorbing devices on one vehicle operatively interconnecting the primary engagement device with the secondary engagement device on that vehicle to at least partly absorb the shock of such engagement, and actuation means to axially relatively move the primary engagement device and the secondary engagement device on one vehicle to a position wherein the secondary engagement devices engage there being provided further latching means to lock the two secondary engagement devices together on such engagement.

2. A mechanism according to claim 1 having a fixed annulus forming part of the said tubular member, in which the actuation means comprising a plurality of units capable of uniform limited movement around the said annulus, a plurality of pairs of tie rods, one tie rod of each pair being pivoted at one end to one of said units and at the other end to the primary engagement device, one unit having one tie rod, the other tie rod of each pair being pivoted at one end to the primary engagement device and at the other end to the said annulus, the tie rods of each pair lying in a generally V-formation, the V-formation having at its apex the pivotal connections to the primary engagement device.

3. A mechanism according to claim 1 wherein all four engagement devices are of annular form and the two primary engagement devices and the two secondary engagement devices respectively have mating frustro-conical surfaces which tend to urge the vehicles into alignment on engagement.

4. A mechanism according to claim 3 in which the shock absorbing devices and the actuation means are incorporated in the coupling means on one vehicle and are each attached to an intermediate tubular member.

5. A mechanism for the coupling of one space vehicle to another including a coupling means on each vehicle, each coupling means having a primary engagement device and a secondary engagement device in axially speed relationship with one another, there being provided latching means for locking the two primary engagement devices together and further latching means for locking the two secondary engagement devices together, and shock absorbing devices on one vehicle operatively inter-connecting the primary engagement device with the secondary engagement device on that vehicle, actuation means being provided to axially move the primary engagement device and the secondary engagement device on one vehicle from a first position wherein only the primary engagement devices engage and lock together, to a second position wherein the secondary engagement devices engage and lock together; all four engagement devices are of annular form and the two primary engagement devices and the two secondary engagement devices respectively have mating frustro-conical surfaces which tend to urge the vehicles into alignment on engagement; the primary engagement device on the other vehicle being dimensioned to pass through the annular secondary engagement device on the one vehicle and to engage the primary engagement device on said one vehicle; the shock absorbing devices and the actuation means being incorporated in the coupling means on one vehicle and each being attached to an intermediate tubular member, a fixed annulus forming a part of the said tubular member, the actuation means comprising a plurality of units capable of uniform limited movement around the said annulus, a plurality of pairs of tie rods, one tie rod of each pair being pivoted at one end to one of said units and at the other end to the primary engagement device, one unit having one tie rod, the other tie rod of each pair being pivoted at one end to the primary engagement device and at the other end to the said annulus, the tie rods of each pair lying in a generally V - formation, the V-formation having at its apex the pivotal connections to the primary engagement device.

6. A mechanism according to claim 5 wherein extendable means are provided on one vehicle and the coupling means on that vehicle is attached thereto for extension from and retraction into said one vehicle.

* * * * *